United States Patent [19]

Schreiner

[11] Patent Number: 4,582,164

[45] Date of Patent: Apr. 15, 1986

[54] METHOD AND APPARATUS FOR NOISE REDUCTION

[75] Inventor: John R. Schreiner, Liverpool, N.Y.

[73] Assignee: Carrier Corporation, Syracuse, N.Y.

[21] Appl. No.: 707,930

[22] Filed: Mar. 6, 1985

[51] Int. Cl.$^4$ .............................................. E04F 17/04
[52] U.S. Cl. .................................... 181/224; 181/296; 98/DIG. 10
[58] Field of Search .............................. 181/224, 296; 98/DIG. 10

[56] References Cited

U.S. PATENT DOCUMENTS 4,236,597  12/1980  Kiss et al. ........................... 181/224
4,319,521   3/1982  Gorchev et al. ................. 181/224 X
4,432,434   2/1984  Dean, Jr. ........................ 181/224 X Primary Examiner—Benjamin R. Fuller
Attorney, Agent, or Firm—David J. Zobkiw

[57] ABSTRACT

Sound transmission from an equipment room via the air conditioning ductwork must be reduced so as to permit the full use of adjacent areas. The ductwork located within the equipment room is made of a lighter gauge material to facilitate radiation of sound back into the equipment room. The flow is divided into a plurality of duct passages within the duct to achieve sufficient attenuation. Each of the duct passages is lined on all sides so that there is a double thickness of acoustic insulation between adjacent duct passages.

3 Claims, 6 Drawing Figures

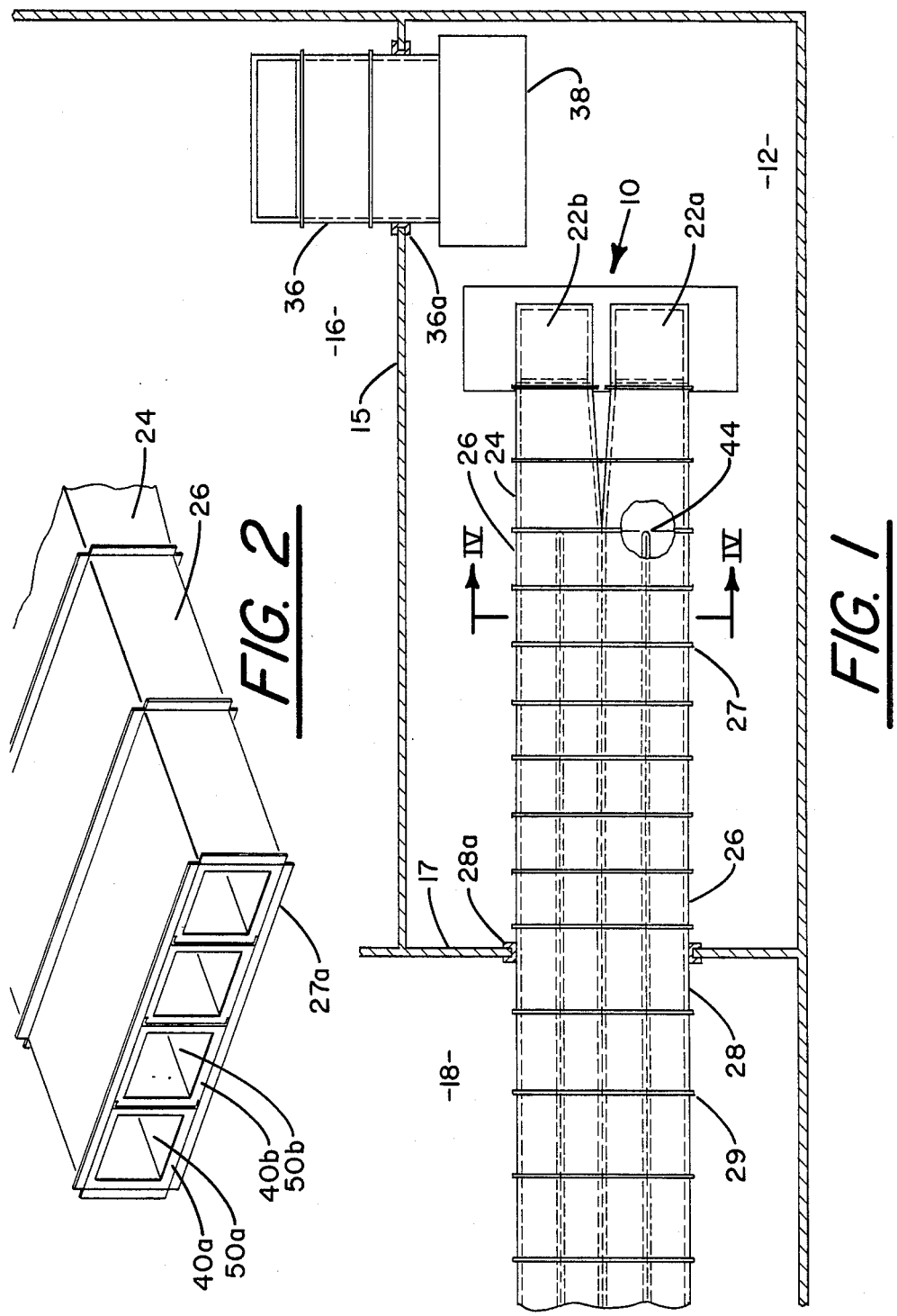

METHOD AND APPARATUS FOR NOISE REDUCTION

BACKGROUND OF THE INVENTION

In commercial multi-story buildings it is a common practice to have indoor air conditioning units to serve individual tenants and/or groupings of floors. While such a system requires an equipment room and the attendant loss of usable space, it is imperative that the equipment located in the equipment room be unobtrusive to the surrounding areas. For example, it is desirable to be able to locate an office having a common wall with the equipment room. Although the walls of the equipment room can be acoustically insulated, the ductwork associated with the air conditioning system can serve as a sound conduit for conducting equipment room noise to other places. Sound insulating material can be used to line the duct, but this is not sufficient to reduce the noise to an acceptable level, even where several thicknesses of sound insulation are used. Normal commercially available mufflers are unsuitable because they cause too high of pressure drop which is a greater problem in a high velocity unit.

Sound transmission from the equipment room can be via the supply duct, via the return duct, via any openings or cracks or via the wall. A sufficient construction such as heavy masonry reduces the sound transmission through the walls. Generally, insulation is better at higher frequencies so that it is the low frequencies, under 100 Hertz, that control. At these low frequencies, the sound passing through the duct wall is like a rumble which is often taken to be a vibration. The problem is more serious in variable air volume systems which are system power controlled than in constant volume systems, since a static pressure of one inch of water may be necessary for proper operation of the controls. Because fan noise varies directly with the air quantity and the square of the pressure, the static pressure requirements inherently raise the noise level.

SUMMARY OF THE INVENTION

The present invention is directed to a method and apparatus for noise reduction to reduce the equipment room source noise to an acceptable level at points exterior to the equipment room. To achieve this, the duct is vibrationally isolated from the air conditioning unit and a lighter gauge material is used for the portion of the duct within the equipment room. This reduces the amount of vibration initially transmitted to the supply duct and permits the radiation of sound through the duct back into the equipment room. As the walls, floor and ceiling of the equipment room are sound insulated, the radiation of sound into the equipment room from the duct is of little consequence within the equipment room, but the sound transmitted through the duct is reduced. The portion of the duct located outside of the equipment room is made of a heavier gauge material to that there is less transmission of sound through the cut wall. The duct leading from the air conditioning unit is divided into a plurality of flow paths which are preferably within one duct. This division of the flow is to achieve sufficient attenuation which is a function of the aspect ratio (the ratio of the perimeter to the area of each flow path). It is desirable to have a large aspect ratio for attenuation, but the flow path must not be restricted such that there is an insufficient free area. Each of the divided flow paths is acoustically insulated on all sides such that there is twice as much insulation between flow paths as is between the flow paths and the surrounding environment.

It is an object of this invention to achieve sound attenuation while mimimizing the attendant pressure drop.

It is a further object of this invention to minimize sound transmission via the ductwork of central air conditioning unit.

It is an additional object to provide apparatus for sound isolating air conditioning equipment. These objects, and others as will become apparent, hereinafter, are accomplished by the present invention.

Basically, the ductwork is vibrationally isolated from the air conditioning unit. The duct is made of a lighter gauge material for that portion of the ductwork which is located within the equipment room while a heavier gauge material is used for the rest of the ductwork necessary to achieve sufficient attenuation. The flow is divided into a plurality of flow paths within the duct. Each of the flow paths is lined with acoustic insulation such that there is twice as much insulation between adjacent flow paths as there is between each of the flow paths and the surroundings.

BRIEF DESCRIPTION OF THE DRAWINGS

For a fuller understanding of the present invention, reference should now be made to the following detailed description, thereof, taken in conjunction with the accompanying drawings wherein:

FIG. 1 is a top view of a central air conditioning unit employing the present invention;

FIG. 2 is a pictorial view of a portion of the ductwork employed in the present invention;

DESCRIPTION OF THE PREFERRED EMBODIMENT

Figure 3:
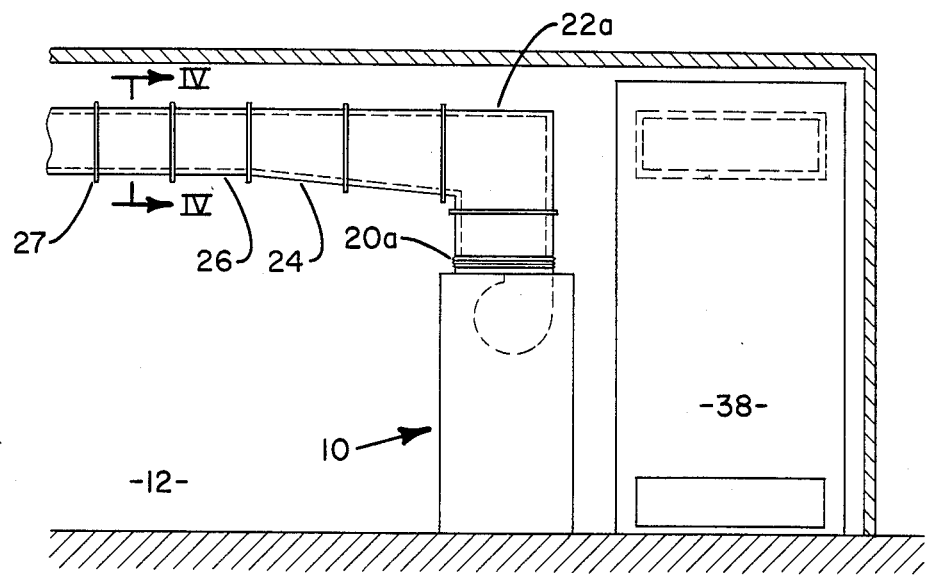
FIG. 3 is a side view of the central air conditioning unit of FIG. 1.

In FIGS. 1 and 3 the numeral 10 generally designates a high velocity, indoor, central air conditioning unit located in equipment room 12. Equipment room 12 is separated from offices 16 and 18 by walls 15 and 17, respectively. Walls 15 and 17 as well as any other internal walls and the floor and ceiling of equipment room 12 are of heavy masonry which provides acoustic insulation and reduces the amount of noise transmitted to adjacent occupied areas. Alternatively, or additionally, acoustic insulation may be provided in the walls, and/or ceiling and floor of equipment room 12 as is necessary, or desired. In the illustrated packaged central air conditioning unit 10, there are two fans and two vertical outlets so that the ductwork starts as two branches having 90° bends 22a and b, respectively. The two branches containing 90° bends 22a and b, respectively, are connected to unit 10 through conventional vibration isolators with only vibration isolator 20a being visible in the drawings. Vibration isolators are, typically, flexible or canvas connectors. The two branches transition into a single duct via transition section 24 which is attached in any suitable conventional manner to one of the light gauge duct sections 26 which make up the portion of the ductwork within equipment room 12. Heavier gauge duct sections 28 make up the portion of the supply duct exterior of the room 12, that is the portion in the occupied room or office 18 and beyond. The duct sections 26 and 28 are suspended from the ceiling by vibration isolators (not illustrated) such as rods with springs, as is conventional. The duct sections 28, which are in the occupied rooms, would be located between the ceiling and the false ceiling, as is conventional. Galvanized steel duct sections 26 and 28 differ in only two aspects, the thickness of the metal of duct 26 in thinner, eg. 0.0296 inches as compared to 0.0575 inches, and because duct 26 is thinner, the sections are shorter, eg. two feet as compared to three feet, to permit reinforcing of the flanges 27 at a closer spacing. The actual dimensions would, however, depend upon the duct sizes of the specific installation. Where a duct section 28 penetrates the wall 17, the opening is sealed by seal 28a which can be any suitable conventional seal.

Figure 5:
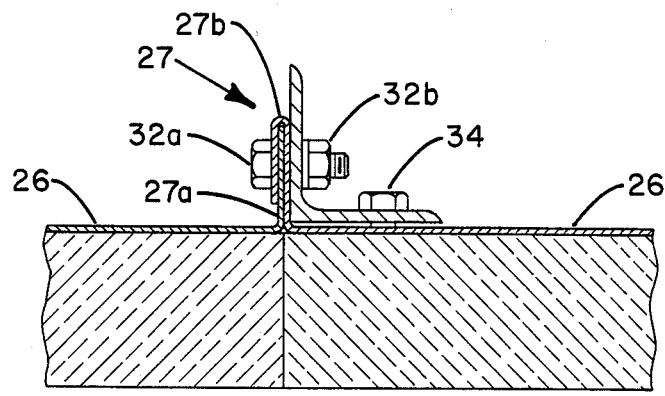
FIG. 5 is a sectional view of the flange structure.

Referring now to FIG. 5, flange 27 is made up of a first portion 27a which is formed at one end of duct section 26 and received in the U-shaped opening formed in second portion 27b which is formed at the other end of a duct section 26. An L-shaped reinforcement member 30 is secured to portions 27a and 27b by bolts 32a and nuts 32b and to duct section 26 by self tapping screws 34. Flange 29 of duct sections 28 are similarly constructed and reinforced for attachment to each other or to duct section 26. Additionally, duct sections 24 and 26 are similarly connected. The actual construction of the duct connections and reinforcement structure can be changed so long as the ducts are tight and have an adequate stiffness.

The conditioned air supplied by unit 10 via the ductwork which includes duct sections 28 is discharged into the various occupied rooms or offices, 16 and 18, as is conventional. Return air is supplied from these rooms, 16 and 18, to equipment room 12 via ductwork which includes duct sections 36 which run between the ceiling and false ceiling of room 16 and terminate in return air plenum 38. Plenum 38 discharges into equipment room 12 rather than being directly connected to the unit 10. Where a duct section 36 penetrates the wall 15, the opening is sealed by seal 36a which can be any suitable conventional seal. Fresh air requirements would be supplied by additional ductwork or the like (not illustrated) communicating the equipment room with the outside and controlled by dampers, as is conventional.

Figure 4:
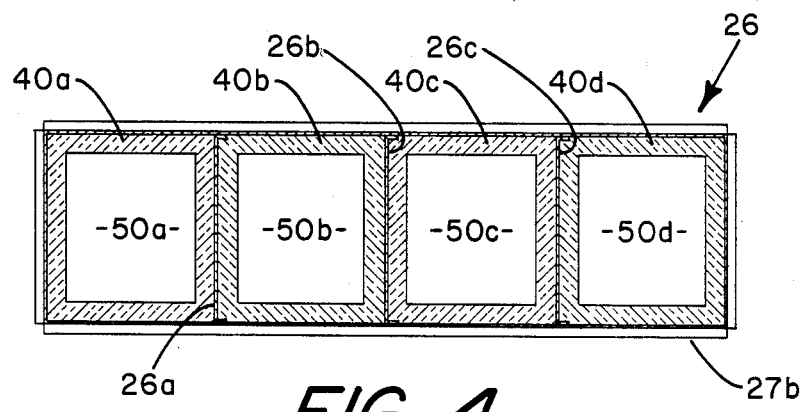
FIG. 4 is a sectional view taken along line IV—IV of FIGS. 1 and 3.

Duct sections 22a and 22b, 24, and 36 are all lined with heavy density fiberglass acoustic insulation, e.g. three pounds per cubic foot, to reduce the transfer of sound, particularly at lower frequencies. In FIG. 4 which is illustrated for duct section 26 but is an equal representation of duct section 28, the duct section 26 is divided into four portions by support spacers 26a–26c. Each of the four resultant portions of the duct section 26 is lined on all sides by acoustic insulation duct liners 40a–40d which form duct passages 50a–50d, respectively. Duct passages 50a and 50b are separated from each other by acoustic insulation duct liner 40a, support spacer 26a and acoustic insulation duct liner 40b. Duct passage 50b and 50c are separated from each other by acoustic insulation duct liner 40b, support spacer 26b and acoustic insulation duct liner 40c. Duct passages 50c and 50d are separated from each other by acoustic insulation duct liner 40c, support spacer 26c and acoustic insulation duct liner 40d. It follows that the double insulation between adjacent duct passages substantially reduces the transmission and reinforcement of sound between the duct passages. If necessary, or desirable, duct sections 36 could be similarly divided and lined with acoustic insulation on all sides of each passage.

Figure 6:
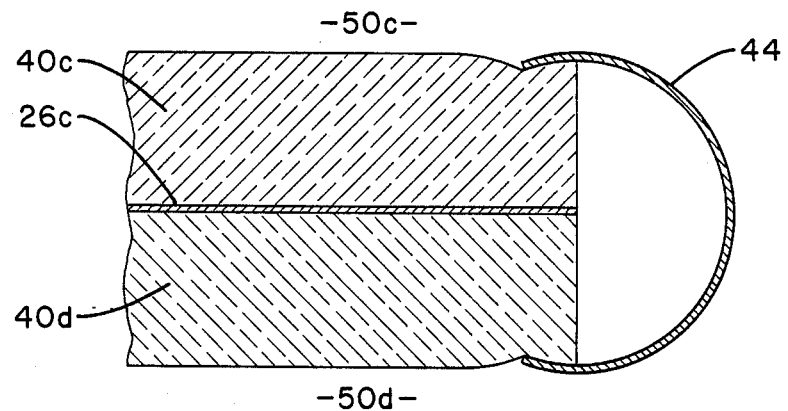
FIG. 6 is a sectional view of the end of a flow divider.

Referring now to FIG. 1, a cutout is shown in the location where duct sections 24 and 26 are joined. FIG. 6 is a sectional view corresponding to the cutout of FIG. 1 and shows that a rounded metal cap 44 is located at the entrance of duct passages 50c and 50d. Cap 44 serves to provide a smooth flow path and to prevent impingement of the air with the ends of acoustic insulation duct liners 40c and 40d at the point where the air flow is divided into duct passages 50c and 50d. A similar metal cap (not illustrated) is located over the ends of acoustic insulation duct liners 40a and 40b at the entrance to duct passages 50a and 50b.

High velocity conditioned air passes from central air conditioning unit 10 at, for example, 2500 feet per minute into two branches of the ductwork which are connected to the unit 10 through vibration isolators to reduce sound transmission into the ductwork. All of the ductwork is lined with an acoustic insulation duct liner to absorb sound. The two branches leading from unit 10 serially contain bends 22a and 22b, respectively, and transition section 24 which combines the two branches into a single duct defined by duct section 26. Duct section 26, in turn divides the flow of each branch into two flows so that duct section 26 has four direct passages, 50a–50d, therein. Metal caps, such as cap 44, are provided to smoothly divide the flow between duct passages 50a and 50b and between duct passages 50c and 50d. Duct sections 26 are formed of light gauge metal so that sound passing through the acoustic insulation duct liners 40a–40d can be more readily radiated back into the equipment room 12. However, the double thickness of acoustic insulation duct liner between adjacent flow paths prevents the transmission and reinforcement of sound between adjacent flow paths. Duct sections 28 are acoustically the same as duct sections 26 except that they are of a heavier gauge which has a dampening on the transmission or radiation of sound.

Obviously, the conditioned air must be supplied into the rooms or offices from the duct. Therefore, duct sections 28 form only a portion of the ductwork, but are of a sufficient total length to sufficiently attenuate the transmission of noise originating in the equipment room 12 to an acceptable level in the rooms immediately adjacent the equipment room 12. The portion of the ductwork containing duct sections 28 is connected to conventional ductwork (not illustrated), as is used in standard practice.

Although a preferred embodiment of the present invention has been illustrated and described, other changes will occur to those skilled in the art. For example, a central air conditioning can be used which would eliminate the need for combining two branches of ductwork. Also, the number and arrangement of the duct passages can be changed as by having two rows of duct passages rather than one row. Additionally, the air conditioning unit can have a horizontal discharge so as to eliminate the 90° bend(s). While only the supply duct has been described as divided, the return duct can be similarly divided if necessary or desired. It is, therefore, intended that the present invention is to be limited only by the scope of the appended claims.

I claim:

1. A method for reducing noise transmission from an air conditioning unit located in an equipment room via ductwork comprising the steps of:
   supplying conditioned air to the ductwork;

dividing the flow within the ductwork into a plurality of flow paths defined by duct passages with each duct passage having an acoustic insulation duct liner on all sides;

radiating sound through a first portion of the ductwork which is of a light gauge and located within the equipment room, whereby sound transmission beyond the equipment room is reduced; and passing the conditioned air through the plurality of flow paths in a second portion of the ductwork of a heavier gauge outside of the equipment room for a sufficient distance to achieve a desired sound attenuation.

2. Duct structure for reducing noise transmission comprising:

a plurality of sections of light gauge duct divided into a plurality of portions;

each of said portions being lined on all sides by acoustic insulation duct liner means and defining a flow passage such that a double lining of acoustic insulation duct liner means separates adjacent flow passages;

at least one section of heavier gauge duct located downstream of said plurality of sections of light gauge duct and divided into a plurality of portions corresponding to said plurality of portions in said light gauge duct; and said plurality of portions in said at least one section of heavier gauge duct being lined on all sides with acoustic insulation duct liner means and defining a flow passage which is a continuation of the corresponding flow passage in said light gauge duct.

3. Duct structure for reducing noise transmission comprising:

a plurality of sections of light gauge duct divided into a plurality of portions;

each of said portions being lined on all sides by acoustic insulation duct liner means and defining a flow passage such that a double lining of acoustic insulation duct liner means separates adjacent flow passages;

a plurality of sections of heavier gauge duct located downstream of said plurality of sections of light gauge duct and divided into a plurality of portions corresponding to said plurality of portions in said light gauge duct;

each of said plurality of portions in said heavier gauge duct being lined on all sides with acoustic insulation duct liner means and defining a flow passage which is a continuation of the corresponding flow passage in said light gauge duct; and said plurality of sections of heavier gauge duct extending for a sufficient distance to achieve a desired sound attenuation.

* * * * *